United States Patent
Council et al.

(10) Patent No.: US 6,587,550 B2
(45) Date of Patent: *Jul. 1, 2003

(54) METHOD AND APPARATUS FOR ENABLING A FEE TO BE CHARGED TO A PARTY INITIATING AN ELECTRONIC MAIL COMMUNICATION WHEN THE PARTY IS NOT ON AN AUTHORIZATION LIST ASSOCIATED WITH THE PARTY TO WHOM THE COMMUNICATION IS DIRECTED

(76) Inventors: Michael O. Council, 186 Hurt Dr., Cordele, GA (US) 31015; Daniel J. Santos, 3525 Roswell Rd., #721, Atlanta, GA (US) 30305

( * ) Notice: Subject to any disclaimer, the term of this patent is extended or adjusted under 35 U.S.C. 154(b) by 0 days.

This patent is subject to a terminal disclaimer.

(21) Appl. No.: 09/783,340

(22) Filed: Feb. 14, 2001

(65) Prior Publication Data

US 2001/0023432 A1 Sep. 20, 2001

Related U.S. Application Data

(63) Continuation-in-part of application No. 09/145,710, filed on Sep. 2, 1998, now Pat. No. 6,192,114.

(51) Int. Cl.[7] .............................................. H04M 11/00
(52) U.S. Cl. .............................. 379/100.08; 379/93.24; 709/206
(58) Field of Search ..................... 379/100.03, 100.04, 379/100.08, 114.01, 93.23, 93.24, 100.05, 100.06, 206, 203, 207, 219, 238, 245

(56) References Cited

U.S. PATENT DOCUMENTS

| | | | | |
|---|---|---|---|---|
| 5,327,486 A | * | 7/1994 | Wolff et al. | 379/142 |
| 5,473,671 A | * | 12/1995 | Partridge, III | 379/142 |
| 5,625,680 A | * | 4/1997 | Foladare et al. | 379/199 |
| 5,742,668 A | * | 4/1998 | Pepe et al. | 379/67.1 |
| 5,835,087 A | * | 11/1998 | Herz et al. | 345/327 |
| 5,987,606 A | * | 11/1999 | Cirasole et al. | 713/200 |
| 6,005,870 A | * | 12/1999 | Leung et al. | 379/201 |
| 6,023,723 A | * | 2/2000 | McCormick et al. | 709/206 |
| 6,061,718 A | * | 5/2000 | Nelson | 709/206 |
| 6,064,723 A | * | 5/2000 | Cohn et al. | 379/88.14 |

* cited by examiner

*Primary Examiner*—Rexford Barnie
(74) *Attorney, Agent, or Firm*—Gardner Groff, P.C.

(57) ABSTRACT

A method and apparatus for determining whether a party sending an email communication is on a list of parties authorized by the intended receiving party. If the sending party is not on the list of authorized parties, an electronic billing agreement is emailed to the sending party indicating a fee that will be charged to the sending party in return for the message being provided to the intended receiving party. Preferably, the present invention is implemented with Internet communications and utilizes a security protocol to enable the electronic transaction to be transacted in a secure manner.

14 Claims, 3 Drawing Sheets

METHOD AND APPARATUS FOR ENABLING A FEE TO BE CHARGED TO A PARTY INITIATING AN ELECTRONIC MAIL COMMUNICATION WHEN THE PARTY IS NOT ON AN AUTHORIZATION LIST ASSOCIATED WITH THE PARTY TO WHOM THE COMMUNICATION IS DIRECTED

CROSS REFERENCE TO RELATED APPLICATIONS

This application is a continuation-in-part application of application Ser. No. 09/145,710, filed Sep. 2, 1998, now U.S. Pat. No. 6,192,114.

TECHNICAL FIELD OF THE INVENTION

The present invention relates to the field of communications and, more particularly, to a method and apparatus for determining whether an electronic mail communication sent to an intended recipient has been sent by a sending party that is authorized to communicate with the intended recipient, and if not, to provide the sending party with an option of paying a fee in order for the communication to provided to the intended recipient.

BACKGROUND OF THE INVENTION

Currently, when a subscriber of an Internet Service Provider (ISP) wants to check his or her electronic mail, the subscriber connects to the subscriber's ISP and any new mail is downloaded to the subscriber's computer, or data terminal equipment (DTE), via the subscriber's data communication equipment (DCE), e.g., a modem, which is coupled to the DTE. The subscriber may have to dial in to the ISP in order for these events to occur or the subscriber may be connected to a server that periodically connects with the ISP or that has a "nailed up" connection to the ISP to enable email for the subscriber to be downloaded to the server. In each of these cases, email intended for the subscriber is ultimately downloaded from the ISP and displayed on a monitor comprised by the subscriber's DTE.

Oftentimes, people solicit business over the Internet by sending out email messages, which may be, for example, advertisements, to large numbers of people, which is commonly referred to as "spam". The recipients of these messages often are not interested in receiving these messages. Sometimes these messages contain a large quantity of data and may take quite a bit of time to download. Furthermore, some of these messages contain data such as computer viruses that can adversely affect the subscriber's computer.

Although techniques are known that allow ISP subscribers to screen unwanted email communications, none offers the ability to provide the sender with the option of paying a fee in return for being allowed to communicate with the intended recipient. By providing the sender with the option of paying a fee in return for allowing them to communicate with the intended recipient via email, the common practice of broadcasting spam to recipients with whom the sender has no prior relationship could be hindered or eliminated. However, simply preventing email from being sent to the recipient may cause the recipient to not receive email that the recipient might otherwise have desired to receive. By providing the sender with the option of paying a fee to have the email sent through to the subscriber might allow the sender to receive the email and, in return, generate revenue, which could be allocated to the recipient and/or to the recipient's ISP.

Accordingly, a need exists for a method and apparatus that allow unwelcome or unsolicited email messages to be screened out so that they are not downloaded to the subscriber, or to allow the messages to be provided to the subscriber in return for paying a fee.

SUMMARY OF THE INVENTION

The present invention provides a method and apparatus for determining whether a party sending an email communication is on a list of parties authorized by the intended receiving party. If the sending party is not on the list of authorized parties, the recipient is provided with the option of paying, or agreeing to pay, a fee in return for the message being provided to the intended receiving party.

Preferably, the present invention is implemented with Internet communications. However, the present invention can be used in private networks as well, such as local area networks (LANs) and wide area networks (WANs). When used with LANs and WANs, the present invention could be implemented to allow users or system administrators to decide which parties' or entities' email communications will be received by the intended recipient. In this case, a fee may or may not be charged to the sending party.

All or a portion of any fee charged may be paid to the intended receiving party. A portion of the fee may be applied, for example, to the intended receiving party's ISP and/or to the intended recipient. The present invention is not limited with respect to the manner in which the fee is collected and/or used after the sending party has been charged.

The present invention is also not limited with respect to the location at which the method and/or apparatus are located in the communications network. Preferably, the present invention is implemented at the intended receiving party's ISP. In accordance with the well known Transmission Control Protocol/Internet Protocol (TCP/IP), the destination address of the intended receiving party and the source address the sending party are contained in the IP message, commonly referred to as a datagram.

In accordance with the present invention, when a datagram is received at the ISP, the ISP server analyzes the destination address and the source address to determine whether the source address is on a list of authorized source addresses associated with the destination address. If so, the message is saved in a location in the ISP database associated with the destination address so that it is available to be downloaded by the intended recipient. If not, the sending party corresponding to the source address is provided with the option of being charged a fee in return for the message being provided to the recipient.

Preferably, the service provided by the present invention is optional and can be enabled or disabled at the receiving party's ISP depending on whether the receiving party has subscribed to the service.

The present invention is capable of being implemented with any communications protocol that transmits an indication of the source of the message to the intended recipient, including communications protocols that do and do not comply with the Open Systems Interconnect (OSI) model. Preferably, the communications protocol that is used with the present invention is TCP/IP. Other types of public and private communications protocols can also be used with the present invention, including proprietary protocols, as will be understood by those skilled in the art.

These and other features and advantages of the present invention will become apparent from the following description, drawings and claims.

DETAILED DESCRIPTION OF THE INVENTION

Figure 1:
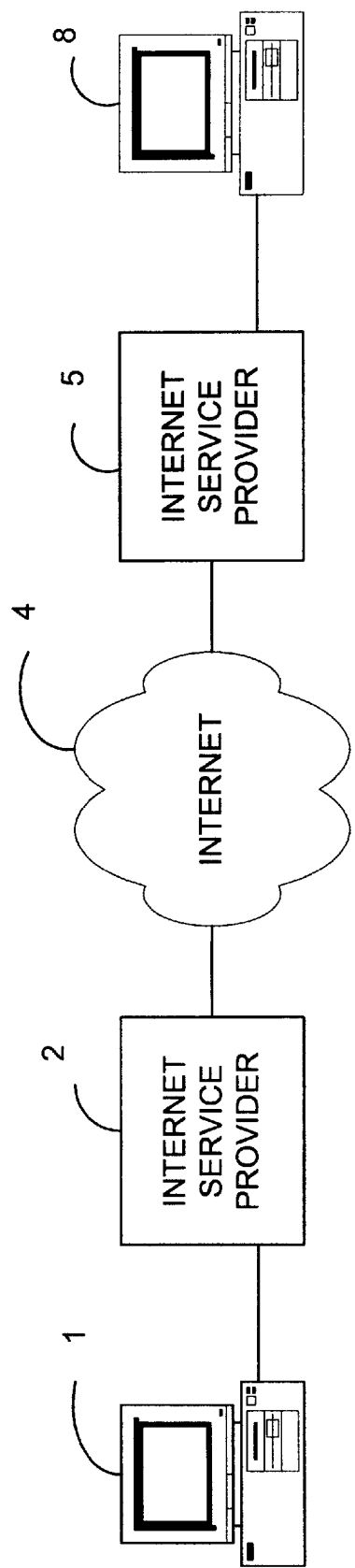
FIG. 1 is a block diagram of an Internet network with which the present invention can be implemented.

FIG. 1 is a block diagram of the preferred embodiment of the present invention wherein the present invention is implemented as part of an ISP system. End users having data terminal equipment (DTEs) 1 and 8, such as personal computers, are connected to the network 4, which preferably is the Internet, via ISPs 2 and 5, respectively. The DTEs 1 and 8 are connected to the ISPs 2 and 5 via data communication equipment (not shown), such as modems or terminal adapters. The ISPs 2 and 5 typically comprise one or more servers and several modems, or data communications equipment devices, for interfacing with the network 4.

In accordance with the present invention, when a sending party represented by DTE 1 sends an email message to an intended receiving party represented by DTE 8, the intended receiving party's ISP 5 determines whether the source address associated with the email communication is a source address authorized by the intended receiving party. In order to perform this task, a computer (not shown) located at the ISP compares the source address with a list of source addresses associated with the destination address to determine whether the source address is an authorized source address. If so, the computer stores the message at the location in the ISP database corresponding to the mail box associated with the destination address, i.e., the intended recipient's mail box. If not, the computer sends an email message to the sending party in the form of an agreement or payment statement that provides the sending party with the option of paying a fee in return for the sending party's email communication to be communicated by the intended recipient's ISP to the intended recipient. The manner in which this transaction takes place is discussed below with reference to FIGS. 2 and 3.

As stated above, the present invention can be used with all types of networks, including the Internet and private networks, such as local area networks (LANs) and wide area networks (WANs). The present invention is also not limited with respect to the location at which the method and/or apparatus are located in the communications network. Preferably, the present invention is implemented at the intended receiving party's ISP. Alternatively, the present invention could be implemented at, for example, routers of the network or at the sending party's ISP.

Preferably, the communications protocol that is used with the present invention is TCP/IP. When using TCP/IP, the destination address of the intended receiving party and the source address the sending party are contained in the IP message, or datagram. However, many other types of communications protocols also transmit an indication of the source of the message to the intended recipient, including communications protocols that do and do not comply with the Open Systems Interconnect (OSI) model. Other types of public and private communications protocols can also be used with the present invention, including proprietary protocols, as will be understood by those skilled in the art.

Figure 2:
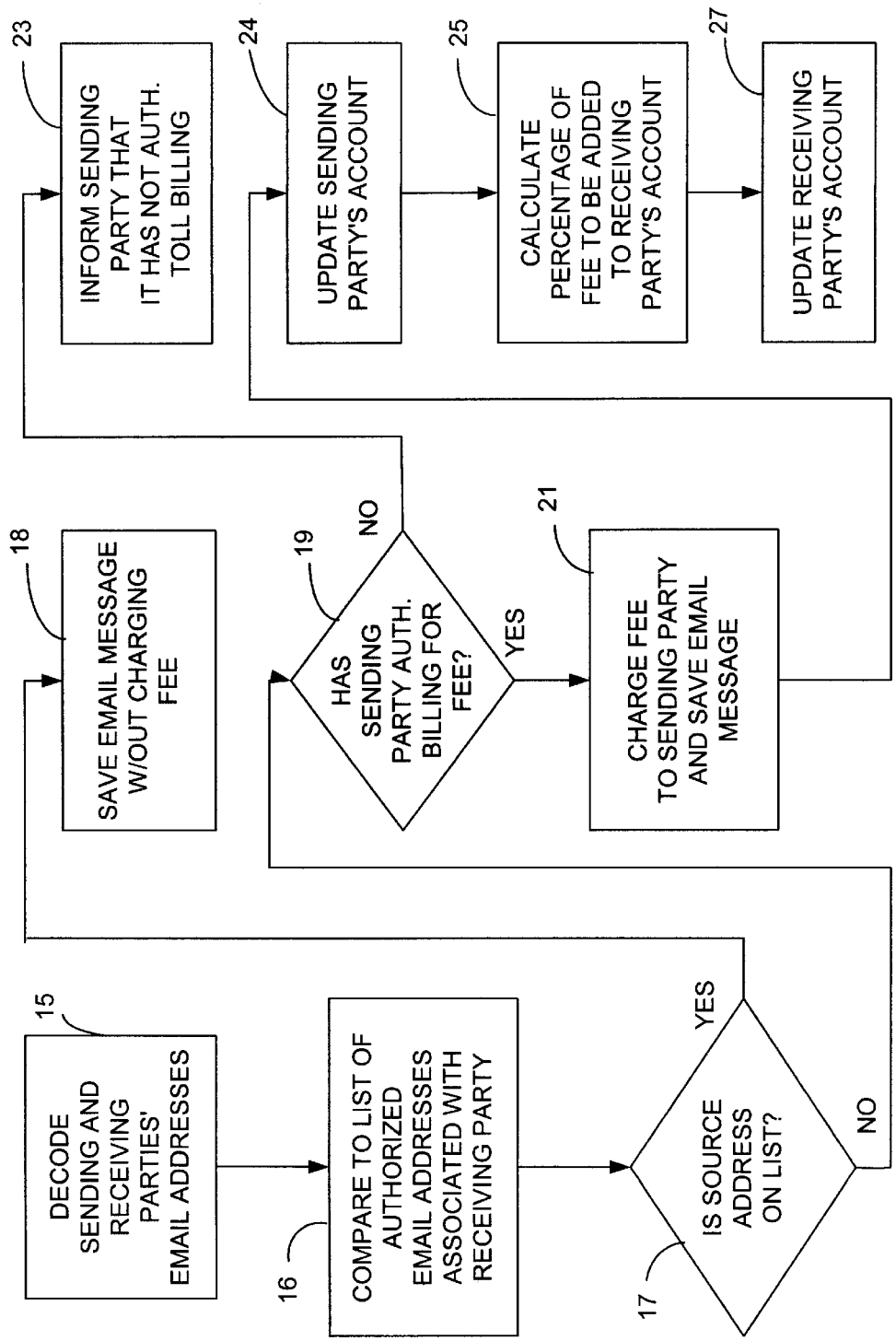
FIG. 2 is a flow chart functionally demonstrating the method of the present invention in accordance with a first embodiment.

Preferably, the service provided by the present invention is optional and can be enabled or disabled at the receiving party's ISP depending on whether the receiving party has subscribed to the service. FIG. 2 is a flow chart illustrating the method of the present invention in accordance with a first embodiment wherein a determination is made as to whether an e-mail message has originated from an authorized e-mail source address. The computer at the ISP decodes the datagram and obtains the source and destination addresses, as indicated at block 15. The computer then compares the source address with a list of source addresses associated with the destination address and makes a determination as to whether the source address is on a list of authorized source addresses, as indicated at block 16 and 17. Thus, the destination address is used to determine which list is associated with the intended receiving party.

If a determination is made that the source address is on the list of authorized e-mail addresses, then the e-mail message is saved in a location in a database associated with the e-mail address of the receiving party so that the receiving party can access the e-mail message, as indicated at block 18. In this case, a fee is not charged to the sending party. If the sending party's e-mail address is not on the list of authorized e-mail addresses, then a determination is made as to whether the sending party has authorized the ISP to bill it for these types of fees, as indicated at block 19. If not, the sending party is notified by an e-mail message that it has not authorized fee billing, as indicated at block 23. It should be noted that the steps illustrated at blocks 19 and 23 are optional. Alternatively, the process could proceed directly from decision block 17 to either block 18 or 21, depending on the results of the comparison.

If the sending party has authorized billing for the fees, then the fee is charged to the sending party's billing account and the e-mail message is saved in the receiving party's mailbox, as indicated at block 21. The sending party's billing account is then updated, as indicated at block 24. The percentage of the fee to be added to the receiving party's billing account is then calculated, as indicated at block 25. The receiving party's billing account is then update, as indicated at block 27.

The order in which the steps corresponding to blocks 21 through 27 are performed is not limited to any particular order. It will be understood by those skilled in the art that the order of these steps can be rearranged and performed in any suitable order.

Figure 3:
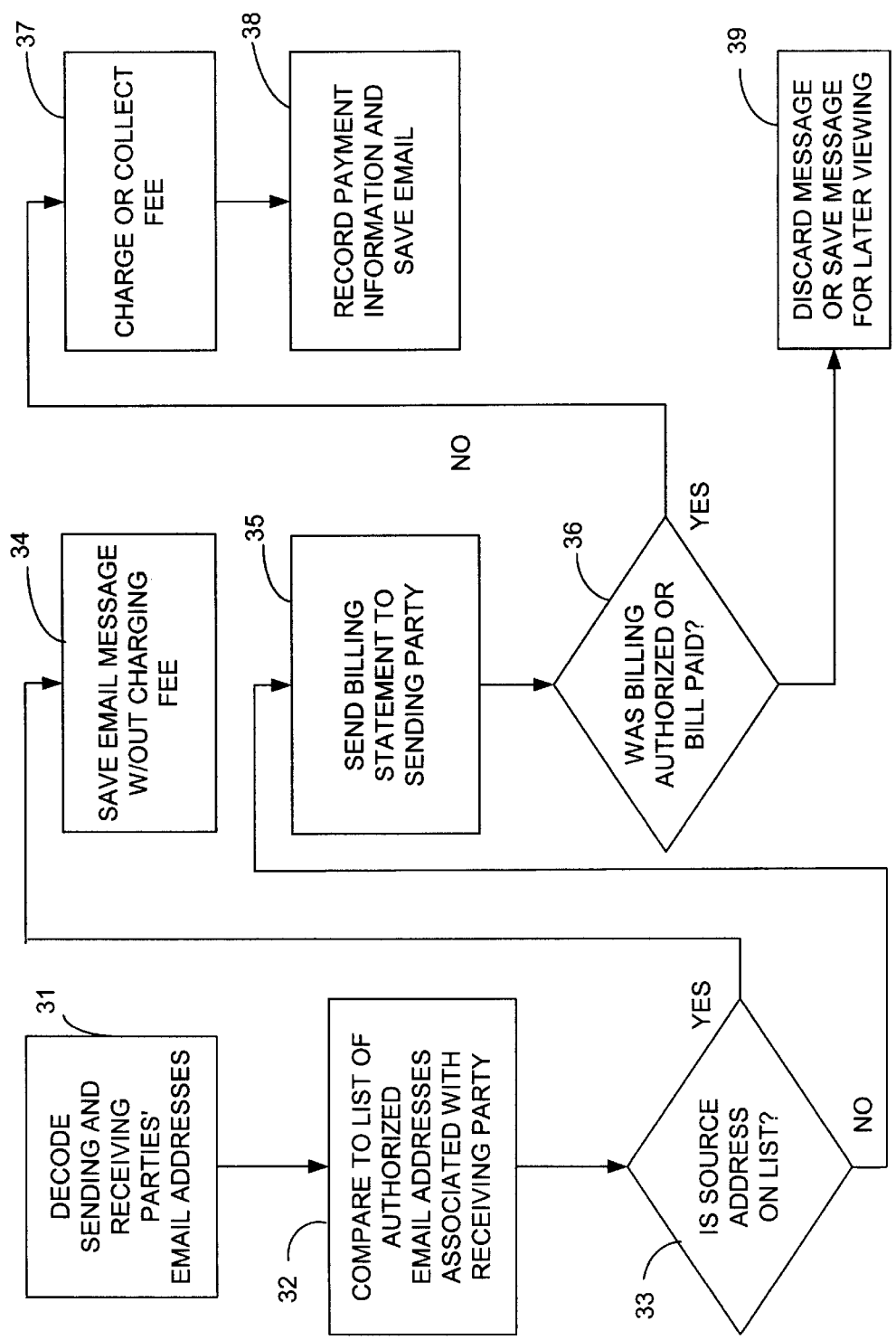
FIG. 3 is a flow chart functionally demonstrating the method of the present invention in accordance with a second embodiment.

FIG. 3 is a flow chart illustrating the method of the present invention in accordance with a second embodiment. In accordance with this embodiment, if the sending party is determined to be an unauthorized sending party, the sending party is provided the option of paying a fee in return for the sending party's email communication to be provided to the intended recipient. The steps corresponding to blocks 31, 32, 33 and 34 in FIG. 3 preferably are identical to blocks 15, 16, 17 and 18, respectively, in FIG. 2.

The computer at the ISP decodes the datagram and obtains the source and destination addresses, as indicated at block 31. The computer then compares the source address with a list of source addresses associated with the destination address and makes a determination as to whether the source address is on a list of authorized source addresses, as indicated at block 32 and 33. If a determination is made that the source address is on the list of authorized e-mail addresses, then the e-mail message preferably is saved in a location in a database associated with the e-mail address of the receiving party so that the receiving party can access the e-mail message, as indicated at block 34.

If the sending party's e-mail address is not on the list of authorized e-mail addresses, then an email communication in the form of a billing statement or an electronic agreement is transmitted to the sending party, as indicated by block 35. The billing statement may be in the form of, for example, an executable that the sending part can open by simply using an input device, such as a mouse, to run the executable (e.g., by clicking the left mouse button one time). The statement would state the terms of the transaction and preferably would contain a hyperlink associated with a button, such as a "Yes" button. If the sending party agrees to the terms set forth in the statement, the sending party would simply click the "Yes" button, which would cause an executable associated with the hyperlink to be executed, which would then cause the sending party's affirmation to pay the fee to be sent to a location and stored for billing purposes.

Alternatively, the statement could be in the form of an electronic agreement that would allow the sending party to enter a pre-authorized billing account number or a credit card number for immediate payment of the fee. In this case a proprietary or known security protocol could be used to secure the transaction. This is especially desirable where the communications are occurring over a public network, such as the Internet. In the electronic agreement, the sending party could authorized that the entered billing account number could be used for this particular email communication or for this and all future email communications intended for the targeted recipient. Once the sending party has completed filling in the appropriate billing information, the sending party would send it to a location indicate in the electronic agreement by, for example, clicking on a "Finished" button, which would cause an executable to run that would cause the account to be billed and any other information, such as authorization for future billing to be sent to some location for record keeping.

If the sending party agreed to pay or in fact paid, as indicated by block 36, the fee is charged or collected, as indicated by block 37, the email communication is saved at the ISP in the intended recipients mail box so that the intended recipient can access the communication and any necessary or desired payment information is recorded, as indicated by block 38. If the sending party did not agree to pay or did not pay, the email communication is discarded. As an alternative to simply discarding the information, all communications from sending parties that did not pay or agree to pay could be saved at some location so that the intended recipient could later review them at his or her leisure, as indicated by block 39.

This latter step is optional, and the ISP may or may not charge subscribers for this service. However, such a feature could be useful in many cases. For example, revenue could be generated from the sending parties that are willing to pay, but with respect to those who are not willing to pay, the intended recipient would still be able to view the messages when they desire. This could also be an option provided on the billing statement or electronic agreement sent to the sending party, i.e., the sending party could be charged one amount for immediate communication of the message to the intended recipient and charged a lesser amount or nothing for delayed communication of the message to the intended recipient. Those skilled in the art will understand, in view of the discussion provided herein, the manner in which many variations could be made to this or a similar type of feature.

It should also be noted that, the intended recipient's ISP could be notified that an unauthorized party is attempting to send a message to the intended recipient. The intended recipient would thereby provided with the option of deciding whether or not the sending party should be billed. This would be useful in that the intended recipient could be interested in receiving some communications, and therefore might not desire that the sending party be charged, but is not interested in receiving other communications, or is not interested in receiving communications without the sending party having to pay for the privilege of communicating with him or her. This service may be something that the intended recipient's ISP would charge the subscriber for (i.e., in addition to typical email service) in return for providing the service. However, such charges could be offset by revenue generated through use of the present invention.

It should be noted that the present invention has been described with respect to particular embodiments, but that the present invention is not limited to these embodiments. It will also be understood by those skilled in the art that the manner in which an unauthorized sending party is billed with a fee and the manner in which the billing account of the receiving party is updated is not limited to any particular method. Also, the location at which the billing of the fee and the updating of any accounts is performed is not limited to any particular location. The billing and updating of accounts for unauthorized e-mail addresses can be performed at the ISP location or at some other location in communication with the receiving party's ISP. It will be understood by those skilled in the art that other modifications and variations to the embodiments of the present invention discussed above can be made which are in the scope and spirit of the present invention.

What is claimed is:

1. An apparatus for determining whether a sending party sending an electronic mail communication directed to an intended receiving party is an authorized sending party, the apparatus comprising:

a computer in communication with a network, the computer being programmed to detect an indication of a source of the electronic mail communication initiated by the sending party and to compare the indication to an authorization list to determine whether or not the sending party is an authorized sending party, the authorization list corresponding to a list of sending parties selected by the intended receiving party, wherein the computer, upon determining that a sending party is not an authorized sending party, causes an electronic billing agreement to be sent to the unauthorized sending party, the billing agreement including information relating to a fee that will charged to the unauthorized sending party in return for the electronic mail communication being made available to the intended receiving party.

2. The apparatus of claim 1, wherein the electronic billing agreement includes at least one field that allow the unauthorized sending party to enter account information that can be used for immediate billing, and wherein the electronic billing agreement includes an address to which the electronic billing agreement can be sent once it has been completed and appropriate account information has been entered, thus resulting in an electronic transaction.

3. The apparatus of claim 2, wherein the electronic billing agreement is an executable and includes at least one hyperlink.

4. The apparatus of claim 3, wherein the network is the Internet and wherein a security protocol is utilized to ensure that the electronic transaction is secure.

5. The apparatus of claim 4, wherein the electronic billing agreement includes a first option that the unauthorized sending party could select to allow the unauthorized sending party to be billed a first fee in return for having the electronic mail communication quickly made available to the intended recipient and a second option that the unauthorized sending party could select to allow the unauthorized sending party to be billed a second fee in return for having the electronic mail communication made available to the intended recipient at some later time.

6. The apparatus of claim 1, wherein the computer is located at an Internet Service Provider (ISP) and the network is the Internet, and wherein the intended recipient is provided with an electronic mail message from the ISP indicating the identity of an unauthorized sending party that is attempting to communicate with the intended recipient.

7. A method of determining whether a sending party sending an electronic mail communication to an intended receiving party is an authorized sending party, the method comprising the steps of:

comparing an indication of a source of the electronic mail communication with a list of authorized sending parties associated with the intended receiving party to determine whether or not the sending party is an authorized sending party; and upon determining that a sending party is not an authorized sending party, causing an electronic billing agreement to be sent to the unauthorized sending party, the billing agreement including information relating to a fee that will charged to the unauthorized sending party in return for the electronic mail communication being made available to the intended receiving party.

8. The method of claim 7, wherein the electronic billing agreement includes at least one field that allow the unauthorized sending party to enter account information that can be used for immediate billing, and wherein the electronic billing agreement includes an address to which the electronic billing agreement can be sent once it has been completed and appropriate account information has been entered, thus resulting in an electronic transaction.

9. The method of claim 8, wherein the electronic billing agreement is an executable and includes at least one hyperlink.

10. The method of claim 9, wherein the network is the Internet and wherein a security protocol is utilized to ensure that the electronic transaction is secure.

11. The method of claim 10, wherein the electronic billing agreement includes a first option that the unauthorized sending party could select to allow the unauthorized sending party to be billed a first fee in return for having the electronic mail communication quickly made available to the intended recipient and a second option that the unauthorized sending party could select to allow the unauthorized sending party to be billed a second fee in return for having the electronic mail communication made available to the intended recipient at some later time.

12. The method of claim 7, wherein the computer is located at an Internet Service Provider (ISP) and the network is the Internet, and wherein the method further comprises the step of providing the intended recipient with an electronic mail message from the ISP indicating the identity of an unauthorized sending party that is attempting to communicate with the intended recipient.

13. An apparatus for determining whether a sending party sending an electronic mail communication directed to an intended receiving party is an authorized sending party, the apparatus comprising:

a computer in communication with a network, the computer being programmed to detect analyze the electronic mail communication sent by the sending party to determine whether or not the sending party is an authorized sending party or an unauthorized sending party, and wherein authorized sending parties are parties for whom an agreement to pay an advertising fee in return for allowing an electronic mail communication sent by the sending party to be forwarded over the network to an electronic mail address associated with the intended receiving party has been made.

14. An apparatus for determining whether a sending party sending an electronic mail communication directed to an intended receiving party is an authorized sending party, the apparatus comprising:

a computer in communication with a network, the computer being programmed to determine whether or not the sending party is an authorized sending party or an unauthorized sending party, and wherein if the computer determines that the sending party is an unauthorized sending party, the computer prevents the electronic mail communication from being provided to the intended receiving party unless the unauthorized sending party agrees, or has previously agreed, to pay a fee in return for the electronic mail communication being forwarded to the intended receiving party.

* * * * *